US008234466B2

(12) United States Patent
Yeh (10) Patent No.: US 8,234,466 B2
(45) Date of Patent: Jul. 31, 2012

(54) FLASH MEMORY STORAGE SYSTEM APPLYING SLC NAND FLASH MEMORY AND MLC NAND FLASH MEMORY AND DATA WRITING METHOD THEREOF

(75) Inventor: Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 893 days.

(21) Appl. No.: 12/263,040

(22) Filed: Oct. 31, 2008

(65) Prior Publication Data

US 2010/0042773 A1 Feb. 18, 2010

(30) Foreign Application Priority Data

Aug. 12, 2008 (TW) ............................... 97130697 A (51) Int. Cl.
G06F 12/00 (2006.01)
G06F 13/00 (2006.01)
G06F 13/28 (2006.01)
(52) U.S. Cl. ...................................................... 711/162
(58) Field of Classification Search .................. 711/162
See application file for complete search history.

(56) References Cited

U.S. PATENT DOCUMENTS 5,519,831 A * 5/1996 Holzhammer .................. 714/22
6,940,768 B2 * 9/2005 Dahlberg et al. ............. 365/201

FOREIGN PATENT DOCUMENTS

TW 200820259 5/2008

OTHER PUBLICATIONS

Yim, "A Novel Memory Hierarchy for Flash Memory Based Storage System", Dec. 3, 2005, Samsung Advanced Institute of Technology Computing Laboratory, pp. 262-269.*
Handy, "The Cache Memory Book", 1993, Academic Press, pp. 87-91.*

* cited by examiner

Primary Examiner — Kevin Ellis
Assistant Examiner — Chad Davidson
(74) Attorney, Agent, or Firm — J.C. Patents (57) ABSTRACT

A flash memory storage system and a data writing method thereof are provided. The flash memory storage system includes a controller, a connector, a cache memory, a SLC NAND flash memory and a MLC NAND flash memory. When the controller receives data to be written into the MLC NAND flash memory from a host system, the data is temporarily stored in the cache memory first and then is written into the MLC NAND flash memory from the cache memory. And, the controller may backup the data stored in the cache memory to the SLC NAND flash memory. Accordingly, it is possible to reduce a response time for a flush command, thereby improving a performance of the flash memory storage system.

13 Claims, 6 Drawing Sheets

| Lower page | Upper page |
|---|---|
| 0 | 4 |
| 1 | 5 |
| 2 | 8 |
| 3 | 9 |
| 6 | 12 |
| 7 | 13 |
| 10 | 16 |
| 11 | 17 |
| ⋮ | ⋮ |
| 110 | 116 |
| 111 | 117 |
| 114 | 120 |
| 115 | 121 |
| 118 | 124 |
| 119 | 125 |
| 122 | 126 |
| 123 | 127 |

FLASH MEMORY STORAGE SYSTEM APPLYING SLC NAND FLASH MEMORY AND MLC NAND FLASH MEMORY AND DATA WRITING METHOD THEREOF

CROSS-REFERENCE TO RELATED APPLICATION

This application claims the priority benefit of Taiwan application serial no. 97130697, filed on Aug. 12, 2008. The entirety of the above-mentioned patent application is hereby incorporated by reference herein and made a part of specification.

BACKGROUND

1. Technology Field

The present invention relates to a storage system. More particularly, the present invention relates to a flash memory storage system applying a multi level cell (MLC) NAND flash memory as a storage medium, and a data writing method thereof.

2. Description of Related Art

With a quick developing of digital camera, cell phone camera and MP3, demand of storage media by customers is increased greatly. Since a flash memory has the advantages of non-volatile, energy saving, small size and none mechanical structure etc., it is suitable for portable applications, and especially for portable battery-powered products. For example, a solid state disk (SSD) is a storage device applying a NAND flash memory as a storage medium.

Generally, the flash memory of a flash memory storage system is divided into a plurality of physical blocks, and the physical blocks are grouped into a data area and a spare area. The physical blocks grouped within the data area are used for storing valid data written based on write commands, and the physical blocks of the spare area are used for substituting the physical blocks in the data area while executing the write command. To be specific, when the flash memory storage system receives the write command from a host for writing data into the physical block of the data area, the flash memory storage system selects a physical block from the spare area, and writes old valid data stored in the physical block of the data area to be written and new data into the physical block selected from the spare area, and further associates the physical block written with the new data to the data area. Moreover, the original physical block in the data area is erased and is associated to the spare area. To smoothly access the physical blocks storing data in an alternation approach, the flash memory storage system can provide logical blocks to the host. Namely, the flash memory storage system can establish a logical-physical address mapping table, and record and update a mapping relation between the logical blocks and the physical blocks of the data area for reflecting alternations of the physical blocks, so that the host can only perform writing to the provided logical blocks, and the flash memory storage system then can read data from or write data into the mapped physical blocks according to the logical-physical address mapping table.

However, with progress of a fabrication process of the flash memory, while a volume design of each physical block becomes greater, time spent on moving the aforementioned old valid data is comparatively increased, so that when the host executes the write command, a relatively long response time has to be waited. Particularly, when the flash memory storage system (for example, the SSD) applying a multi level cell (MLC) NAND flash memory as a storage medium is used as a main hard disk for a host system, the relatively long response time can seriously influence an operation performance of the host system. To resolve such problem, a dynamic random access memory (DRAM) is set in the flash memory storage system to serve as a cache memory. In such a structure, the host system can be notified that the flash memory storage system supports a cache accessing function. Therefore, data received from the host system is temporarily stored in the DRAM for accelerating the operation of the host. However, since the data stored in the DRAM is eliminated when the system is turned off or is substituted by a new data when a storage capacity thereof is insufficient, the host system can send a flush command to the flash memory storage system for indicating the flash memory system to immediately write the data temporarily stored in the DRAM to the MLC NAND flash memory, when the host system is about to be turned off or in case of a special demand. However, if the data temporarily stored in the DRAM is rather scattered, namely, the temporarily stored data belongs to different physical blocks, it takes a relatively long time to write the data of the DRAM to the MLC NAND flash memory. Now, the host system is in a wait state for waiting the flash memory storage system to accomplish the aforementioned operation, and such a delay time may cause an inconvenience for the user. Therefore, a system for accelerating accessing speed of the data temporarily stored in the DRAM is required to be developed in allusion to the storage system applying the MLC NAND flash memory.

SUMMARY

Accordingly, the present invention is directed to a flash memory storage system, which can effectively shorten a response time required when a host system sends a flush command to a cache memory under a structure where a MLC NAND flash memory is used as a storage medium and a cache memory function is activated, so as to improve a whole performance of a system.

The present invention is directed to a data writing method, which can effectively shorten a response time required when a host system sends a flush command to a cache memory under a structure where a MLC NAND flash memory is used as a storage medium and a cache memory function is activated, so as to improve a whole performance of a system.

One principle aspect of the present invention provides a flash memory storage system including a controller, and a connector, a cache memory, a single level cell (SLC) NAND flash memory and a MLC NAND flash memory electrically connected to the controller. When the controller receives data to be written into the MLC NAND flash memory from a host system via the connector, the controller temporarily stores the data into the cache memory, and then writes the data into the MLC NAND flash memory from the cache memory. Moreover, the controller temporarily stores the data stored in the cache memory into the SLC NAND flash memory.

Another aspect of the present invention provides a data writing method for a flash memory storage system including a cache memory, a SLC NAND flash memory and a MLC NAND flash memory. The data writing method includes temporarily storing data to be written to the flash memory storage system into the cache memory and writing the data into the MLC NAND flash memory from the cache memory; and temporarily storing data stored in the cache memory into the SLC NAND flash memory.

Another aspect of the present invention provides a flash memory storage system including a controller, and a connector, a cache memory and a MLC NAND flash memory electrically connected to the controller, wherein the MLC NAND flash memory is divided into a buffer storage area and a data storage area. The buffer storage area and the data storage area respectively have a plurality of physical blocks, and each of the physical blocks includes a lower page and an upper page, wherein when the controller receives data to be written into the MLC NAND flash memory from the host via the connector, the controller temporarily stores the data in the cache memory, and then writes the data into the data storage area from the cache memory. Moreover, the controller temporarily stores the data stored in the cache memory into the lower pages of the buffer storage area.

Another aspect of the present invention provides a data writing method for a flash memory storage system including a cache memory and a MLC NAND flash memory. Wherein, the MLC NAND flash memory includes a buffer storage area and a data storage area. The buffer storage area and the data storage area respectively have a plurality of physical blocks, and each of the physical blocks includes lower pages and upper pages. The data writing method includes temporarily storing data to be written to the flash memory storage system into the cache memory and writing the data into the data storage area of the MLC NAND flash memory from the cache memory; and temporarily storing data stored in the cache memory into the lower pages of the buffer storage area.

Another aspect of the present invention provides a flash memory storage system including a controller, and a connector, a cache memory, a first non-volatile memory and a second non-volatile memory electrically connected to the controller. Wherein, a writing speed of the first non-volatile memory is greater than that of the second non-volatile memory. When the controller receives data to be written into the second non-volatile memory from a host via the connector, the controller temporarily stores the data in the cache memory, and then writes the data into the second non-volatile memory from the cache memory. Moreover, the controller temporarily stores the data stored in the cache memory into the first non-volatile memory.

In the present invention, since a temporary storage area having a relatively fast accessing speed is used for temporarily storing data in the cache memory, a delay problem due to that the host system waits the flash memory storage system arranging the data in the cache memory can be avoided.

In order to make the aforementioned and other objects, features and advantages of the present invention comprehensible, a preferred exemplary embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF EXEMPLARY EMBODIMENTS

To resolve the aforementioned delay problem that in a MLC NAND flash memory storage system having a cache memory, after a flush command is received from a host, a relatively long time is required for writing the data in the cache memory into the MLC NAND flash memory due to data stored in the cache memory is excessively scattered, in the present invention, a temporary storage area (for example, another non-volatile memory) having a non-volatile feature and a relatively fast writing speed is applied to the flash memory storage system for temporarily storing data of the cache memory. Accordingly, when the flash memory storage system receives the flush command from the host, the data can be temporarily stored in such temporary storage area quickly, so as to achieve a temporary storage of the data in the cache memory. Reference will now be made in detail to the present preferred exemplary embodiments of the invention, examples of which are illustrated in the accompanying drawings. Wherever possible, the same reference numbers are used in the drawings and the description to refer to the same or like parts.

First Exemplary Embodiment

Figure 1:
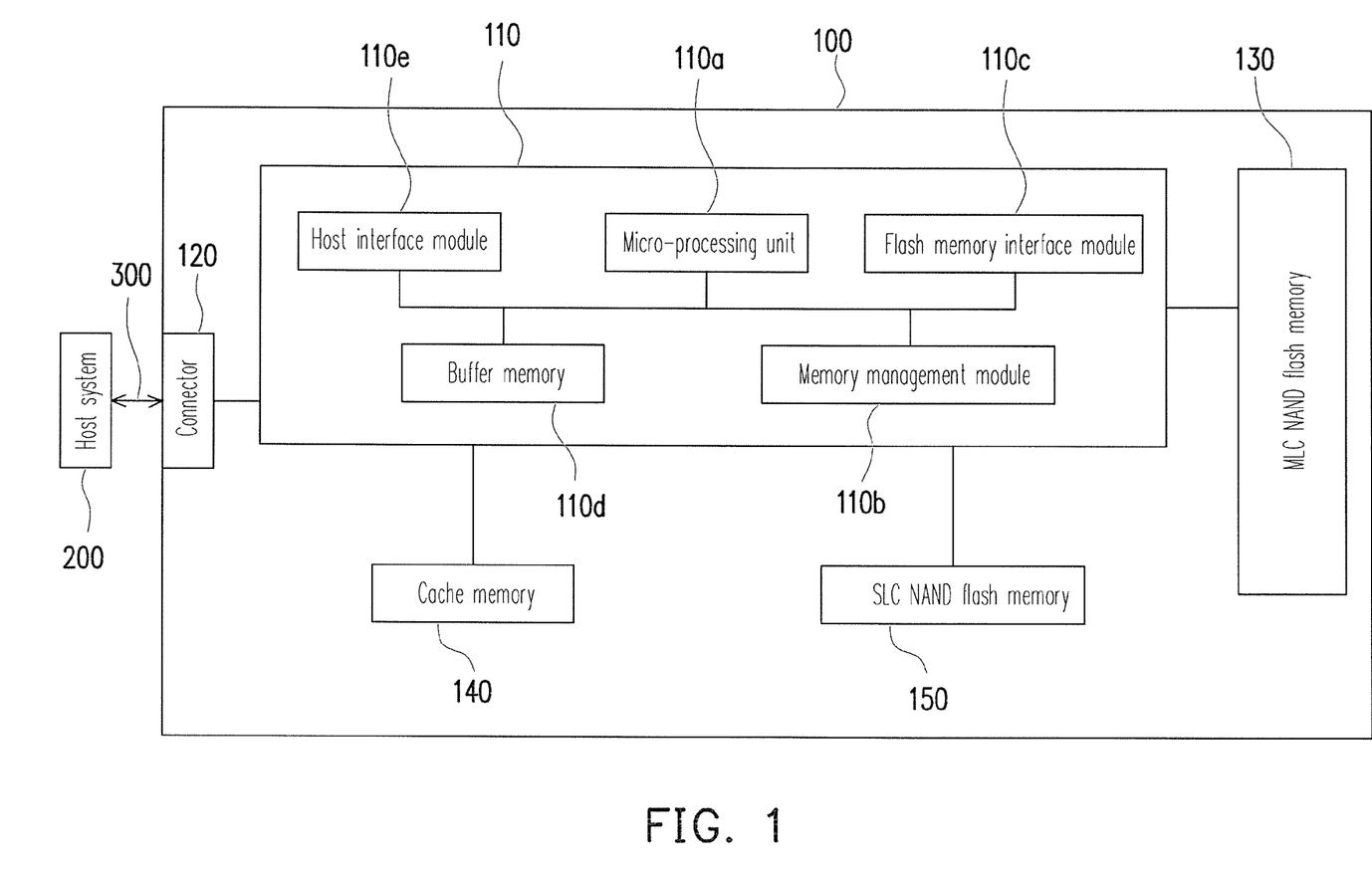
FIG. 1 is a schematic block diagram illustrating a flash memory storage system according to a first exemplary embodiment of the present invention.

FIG. 1 is a schematic block diagram illustrating a flash memory storage system according to a first exemplary embodiment of the present invention. Referring to FIG. 1, the flash memory storage system 100 includes a controller 110, a connector 120, a MLC NAND flash memory 130, a cache memory 140 and a SLC NAND flash memory 150.

Generally, the flash memory storage system 100 is utilized together with a host system 200, so that the host system 200 can write data into the flash memory storage system 100 or read data from the flash memory storage system 100. In the present exemplary embodiment, the flash memory storage system 100 is a solid state drive (SSD) and is applied in the host system 200 to serve as a main hard disk. It should be understood that in another exemplary embodiment, the flash memory storage system 100 can also be a memory card or a flash drive.

The controller 110 can execute a plurality of commands implemented by hardware, firmware or software to perform operations of data storing, data reading and data erasing, etc. in coordination with the connector 120, the MLC NAND flash memory 130, the cache memory 140 and the SLC NAND flash memory 150. The controller 110 includes a micro-processing unit 110*a*, a memory management module 110*b*, a flash memory interface module 110*c*, a buffer memory 110*d* and a host interface module 110*e*.

The micro-processing unit 110*a* is utilized together with the memory management module 110*b*, the flash memory interface module 110*c*, the buffer memory 110*d* and the host interface module 110*e* to perform various operations to the flash memory storage system 100.

The memory management module 110*b* is coupled to the micro-processing unit 110*a*, and has a plurality of machine commands that can be executed by the micro-processing unit 110a for managing the MLC NAND flash memory 130 and the SLC NAND flash memory 150, for example, the machine commands for managing blocks and maintaining a logical-physical address mapping table, etc. Particularly, in the present exemplary embodiment, the memory management module 110b contains machine commands used for implementing data writing steps of the present exemplary embodiment (shown as FIG. 3).

In the present exemplary embodiment, the memory management module 110b is implemented in the controller 110 in a firmware form, for example, the memory management module 110b is implemented by coding related machine commands by using a program language, and storing coded machine commands into a program memory (for example, a read only memory (ROM)). During operation of the flash memory storage system 100, the machine commands of the memory management module 110b is indirectly loaded into the buffer memory 110d for being executed by the micro-processing unit 110a or is directly executed by the micro-processing unit 110a to implement the aforementioned functions of executing a wear leveling procedure, managing damaged blocks, maintaining a logical-physical block mapping table, etc. Particularly, the controller 110 can execute the machine commands of the memory management module 110b to implement the data writing steps of the present exemplary embodiment (shown as FIG. 3).

In another exemplary embodiment of the present invention, the machine commands of the memory management module 110b can also be stored in a specific area (for example, a system area in the flash memory that is specially used for storing system data) of the MLC NAND flash memory 130 or the SLC NANND flash memory 150 in the firmware form. Similarly, during operation of the flash memory storage system 100, the plurality of machine commands of the memory management module 110b is loaded to the buffer memory 110d for being executed by the micro-processing unit 110a. Moreover, in another exemplary embodiment, the memory management module 110b can also be implemented in the controller 110 in a hardware form.

The flash memory interface module 110c is coupled to the micro-processing unit 110a for accessing the MLC NAND flash memory 130 and the SLC NAND flash memory 150. Namely, data to be written into the MLC NAND flash memory 130 and the SLC NAND flash memory 150 is first converted into a format that can be accepted by the MLC NAND flash memory 130 and the SLC NAND flash memory 150 via the flash memory interface module 110c.

The buffer memory 110d is coupled to the micro-processing unit 110a for temporarily storing system data (for example, the logical-physical block mapping table) and the machine commands of the memory management module 110b. In the present exemplary embodiment, the buffer memory 110d is a static random access memory (SRAM). However, it should be understood that the present invention is not limited thereof, and a dynamic random access memory (DRAM), a magnetoresistive random access memory (MRAM), a phase change random access memory (PRAM) or other suitable memories can also be applied.

The host interface module 110e is coupled to the micro-processing unit 110a and is used for receiving and identifying commands sent from the host system 200. Namely, the commands and data sent from the host system 200 are transmitted to the micro-processing unit 110a via the host interface module 110e. In the present exemplary embodiment, the host interface module 110e is a SATA interface. However, it should be understood that the present invention is not limited thereof, and the host interface module 110e can also be a USB interface, an IEEE 1394 interface, a PCI express interface, a MS interface, a MMC interface, a SD interface, a CF interface, an IDE interface or other suitable data transmission interfaces. Particularly, the host interface module 110e corresponds to the connector 120. Namely, the host interface module 110e has to be matched to the connector 120.

Moreover, though not illustrated, the controller 110 may further include general function modules such as an error correction module and a power management module, etc. for controlling the flash memory.

The connector 120 is used for connecting the host system 200 via a bus 300. In the present exemplary embodiment, the connector 120 is SATA connector. However, it should be understood that the present invention is not limited thereto, and the connector 120 can also be a USB interface, an IEEE 1394 interface, a PCI express interface, a MS interface, a MMC interface, a SD interface, a CF interface, an IDE interface or other suitable connectors.

The MLC NAND flash memory 130 is electrically connected to the controller 110 for storing data. The MLC NAND flash memory 130 is substantially divided into a plurality of physical blocks for storing data corresponding to the logical blocks in an alternation approach. Generally, the physical block is a minimum unit that can be erased within the flash memory. Namely, each of the physical blocks contains a minimum number of memory cells that can be erased together. Each of the physical blocks is generally divided into a plurality of pages, and the page is the minimum unit that can be programmed. It should be noted that according to different designs of the flash memory, the minimum programmable unit can also be a sector, namely, the page can be divided into a plurality of the sectors, and the sector is the minimum unit that can be programmed. In other words, the page is the minimum unit that data can be written on or read from. Each page generally includes a user data area D and a redundant area R. The user data area is used for storing a user data, and the redundant area is used for storing a system data (for example, an error correcting code (ECC)).

The data area D usually has 512 bytes and the redundant area R usually has 16 bytes in order to correspond to the size of a sector in a disk driver. Namely, one page is one sector. However, the page may also include a plurality of the sectors, for example, one page may include 4 sectors.

Generally, the physical block may include arbitrary number of pages, for example, 64 pages, 128 pages, 256 pages etc. The physical blocks are generally grouped into a plurality of zones, and managing of the memory based on the zones results in the fact that the zones can be operated independently, so as to increase a parallel degree of operation, and simplify a complexity of the management.

Figure 2A:
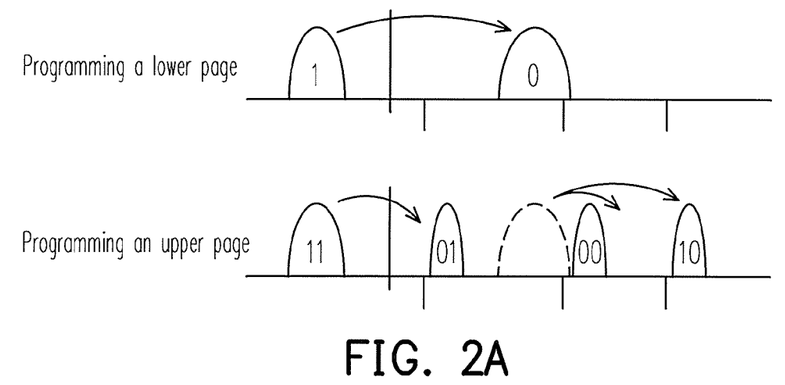
FIG. 2A is a schematic diagram illustrating programming of a MLC NAND flash memory.
Figure 2B:
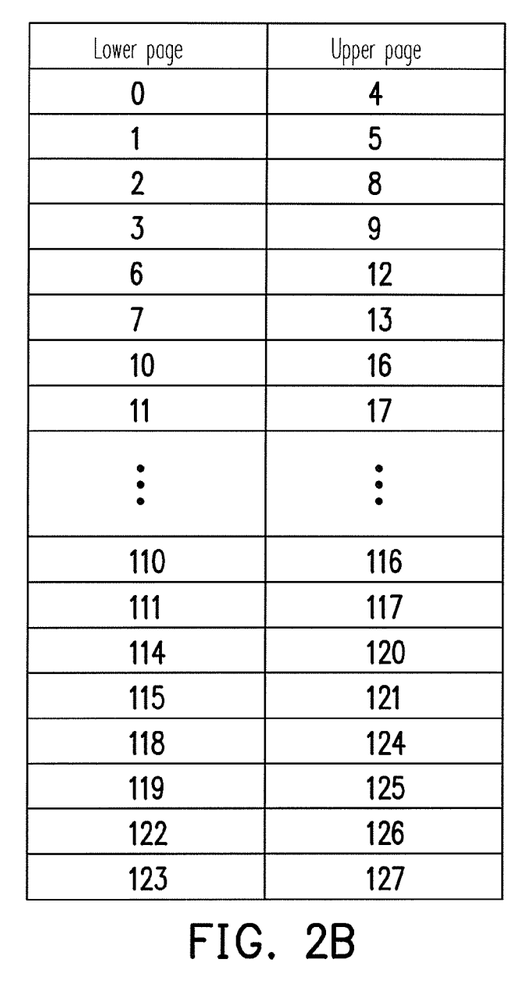
FIG. 2B is a diagram illustrating a configuration of upper pages and lower pages of a physical block of a MLC NAND flash memory.

It should be noted that programming of the physical blocks of the MLC NAND flash memory 130 includes multi-stages. For example, taking a 4-level cell as an example, as shown in FIG. 2A, programming of the physical blocks includes two stages. In a first stage, the lower pages are programmed, and a physical characteristic thereof is similar to that of the SLC NAND flash memory. After the first stage is completed, the upper pages are programmed, wherein data writing speed of the lower page is faster than that of the upper page. Therefore, as shown in FIG. 2B, the pages of each physical block can be divided into slow pages (i.e. the upper pages) and fast pages (i.e. the lower pages). Similarly, in case of an 8-level cell and a 16-level cell, the memory cell may include more pages, and can be programmed in more stages. Here, the page having a fastest writing speed is referred to as the lower page, and other pages having relatively slow writing speeds are all referred to as the upper pages. For example, the upper pages include a plurality of the pages having different writing speeds. Moreover, in other exemplary embodiments, the upper page can also be a page having a lowest writing speed, or the page having the lowest writing speed and the pages having writing speeds thereof being faster than the lowest writing speed. For example, in the 4-level cell, the lower pages are pages having the fastest writing speed and sub-fastest writing speeds, and the upper pages are pages having the lowest writing speed and sub-lowest writing speeds.

Particularly, since the plurality of pages of each physical block of the MLC NAND flash memory 130 can be divided into the upper pages and the lower pages as described above, the memory management module 110b may contain a page inquiry table, in which pages belonged to the upper pages and pages belonged to the lower pages within each of the physical blocks are recorded. It should be noted that a configuration of the upper pages and the lower pages shown in FIG. 2B is only an example, and the present invention is not limited thereto. Therefore, when the MLC NAND flash memory having a different configuration of the upper pages and the lower pages is utilized, the above page inquiry table can be used for recording.

As described above, though the capacity of the MLC NAND flash memory is greater than that of the SLC NAND flash memory, some of the pages of the MLC NAND flash memory belong to the upper pages having the relatively slow writing speed, so that the writing speed of the MLC NAND flash memory is slower than that of the SLC NAND flash memory. Particularly, the more level the MLC NAND flash memory is, the slower the writing speed thereof is compared to that of the SLC NAND flash memory.

Based on the above description, to improve the performance of the flash memory storage system 100 of the present exemplary embodiment, the cache memory 140 is applied to the flash memory storage system 100 for quickly and temporarily storing data transmitted from the host system 200. Next, the controller 110 can write the data to the MLC NAND flash memory 130 from the cache memory 140, during an idle time (or a non-busy period) of the flash memory storage system 100.

Referring to FIG. 1, the cache memory 140 is electrically connected to the controller 110. In the present exemplary embodiment, the cache memory 140 is a dynamic random access memory (DRAM). However, the present invention is not limited thereto, and in another exemplary embodiment of the present invention, the cache memory 140 can also be a double data rate dram (DDR) DRAM. It should be noted that considering the cost and the size of the flash memory storage system 100, storage space of the cache memory 140 is generally not great, for example, in the present exemplary embodiment, the cache memory 140 is a 64 Mb DRAM.

The SLC NAND flash memory 150 is electrically connected to the controller 110 and has a plurality of the physical blocks. Management of the physical blocks of the SLC NAND flash memory 150 is similar to that of the MLC NAND flash memory 130, and therefore detailed description thereof is not repeated. A difference between the SLC NAND flash memory 150 and the MLC NAND flash memory 130 is that programming of the physical blocks of the SLC NAND flash memory 150 has only one-stage, so that the writing speed and stability of the SLC NAND flash memory 150 is greater than that of the MLC NAND flash memory 130.

In the present exemplary embodiment, the SLC NAND flash memory 150 is used for temporarily storing data stored in the cache memory 140. To be specific, when the host system 200 sends the flush command to the flash memory storage system 100, the controller 110 writes the data stored in the cache memory 140 into the SLC NAND flash memory 150. As described above, since the writing speed of the SLC NAND flash memory 150 is greater than that of the MLC NAND flash memory 130, the data of the cache memory 140 can be quickly stored, so as to avoid an operation delay of the host system 200 after the host system 200 sends the flush command. Moreover, since the SLC NAND flash memory 150 is a non-volatile memory, the temporary data stored therein can be maintained after the host system 200 is turned off, and when the host system 200 is again booted, the temporarily stored data is again loaded into the cache memory 140 for continue operations of the flash memory storage system 100, or in another exemplary embodiment of the present invention, when the host system 200 is again booted, the data temporarily stored in the SLC NAND flash memory 150 is written into the MLC NAND flash memory 130 for accomplishing an unexecuted writing operation that should be executed by the flash memory storage system 100 before the host system 200 is turned off, and after the data is directly written into the MLC NAND flash memory 130 from the SLC NAND flash memory 150, the data temporarily stored in the SLC NAND flash memory 150 can be erased or maintained.

In the present exemplary embodiment, the SLC NAND flash memory 150 temporarily storing the data of the cache memory 140 is to avoid losing of the data in the cache memory 140 caused by executing a shut down command or the flush command by the host system 200. Therefore, temporarily storing the data into the cache memory 140 can be regarded as a data backup operation. Particularly, after the data of the cache memory 140 is temporarily stored in the SLC NAND flash memory 150, if the data in the cache memory 140 is not erased, the controller 110 can continually write the data to the MLC NAND flash memory 130 from the cache memory 140.

It should be noted that data is stored to the physical blocks of the SLC NAND flash memory 150 in the alternation approach. Namely, the controller 110 first selects a physical block from the spare area of the SLC NAND flash memory 150, and writes old valid data stored in the physical block of the data area to be written and the new data to be written into the physical block selected from the spare area, and associates the physical block written with the new data to the data area, and then erases the original physical block of the data area and associates it to the spare area. Accordingly, in the present exemplary embodiment, the storage capacity of the SLC NAND flash memory 150 is twice as big as that of the cache memory 140. For example, the SLC NAND flash memory 150 is 128 MB. Therefore, the SLC NAND flash memory 150 can temporarily store all the data of the cache memory 140, reliably.

Figure 3:
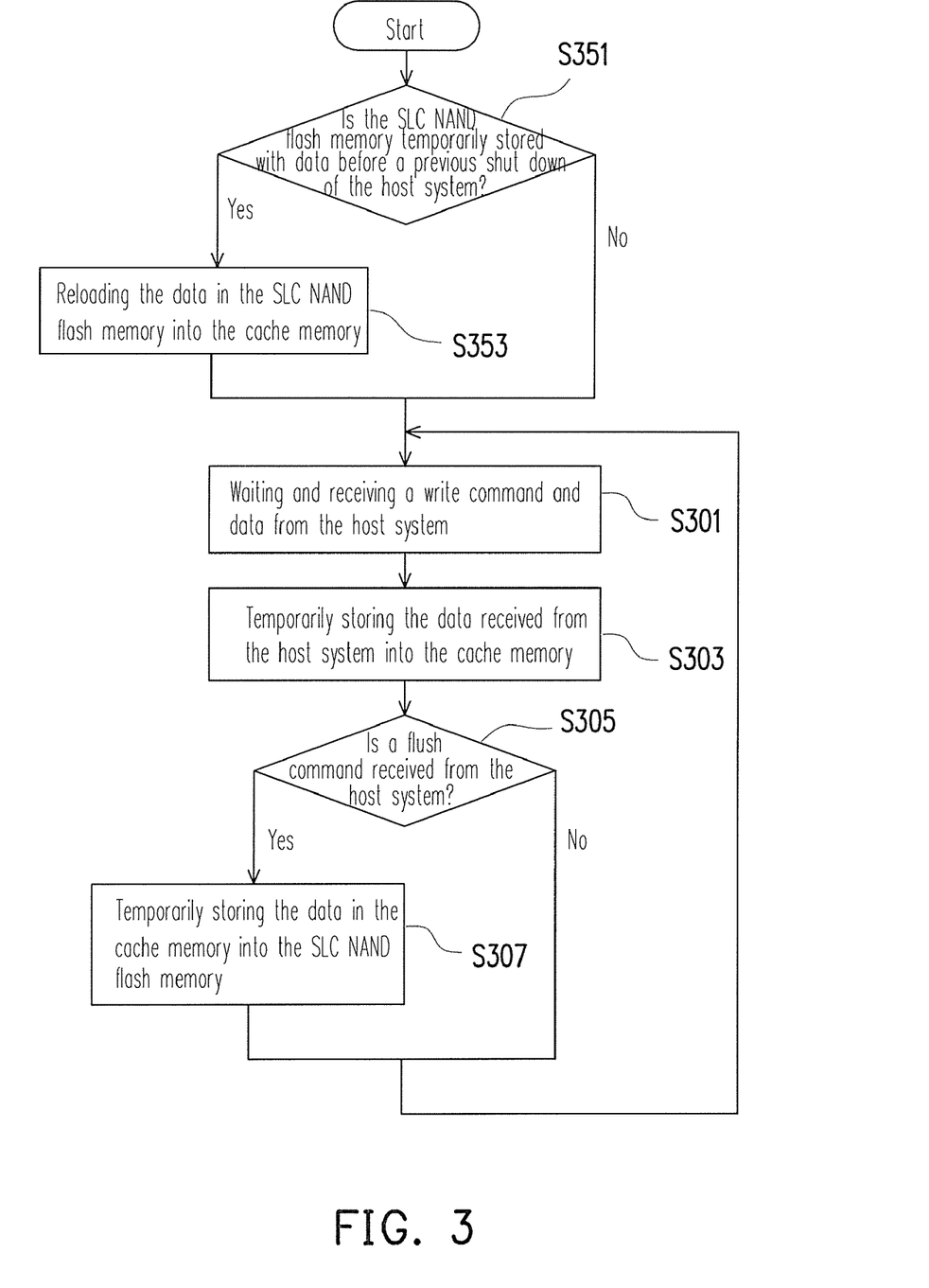
FIG. 3 is a flowchart illustrating data writing steps according to a first exemplary embodiment of the present invention.

FIG. 3 is a flowchart illustrating data writing steps according to the first exemplary embodiment of the present invention. Wherein, such steps are implemented by executing the machine commands of the memory management module 110b via the micro-processing unit 110a of the controller 110.

Referring to FIG. 3, in step S301, the flash memory storage system 100 is on standby and receives the write command and data from the host system 200. It should be noted that in the flowchart, only the steps in allusion to the write command are executed by the flash memory storage system 100, so that in the step S301, the follow-up steps are executed only when the write command is received.

In step S303, the data received from the host system 200 is temporarily stored into the cache memory 140. Particularly, after the data is stored into the cache memory 140, the flash memory storage system 100 responses the host system 200 that the write command is executed, and during a non-busy period (for example, the host system does not send the write command to the flash memory system 100 for a period of time (for example, 30 seconds), or a utilization efficiency of the controller is less than a specific threshold value) of the flash memory storage system 100, the data temporarily stored in the cache memory 140 is written into or is arranged to the MLC NAND flash memory 130.

Next, in step S305, whether the flush command is received from the host system 200 is judged. If in the step S305, the flush command is judged to be received, in step S307, the data in the cache memory 140 is temporarily stored into the SLC NAND flash memory 150. Next, the step S301 is repeated, and the data writing steps are ended when the flash memory storage system 100 is turned off.

Figure 4:
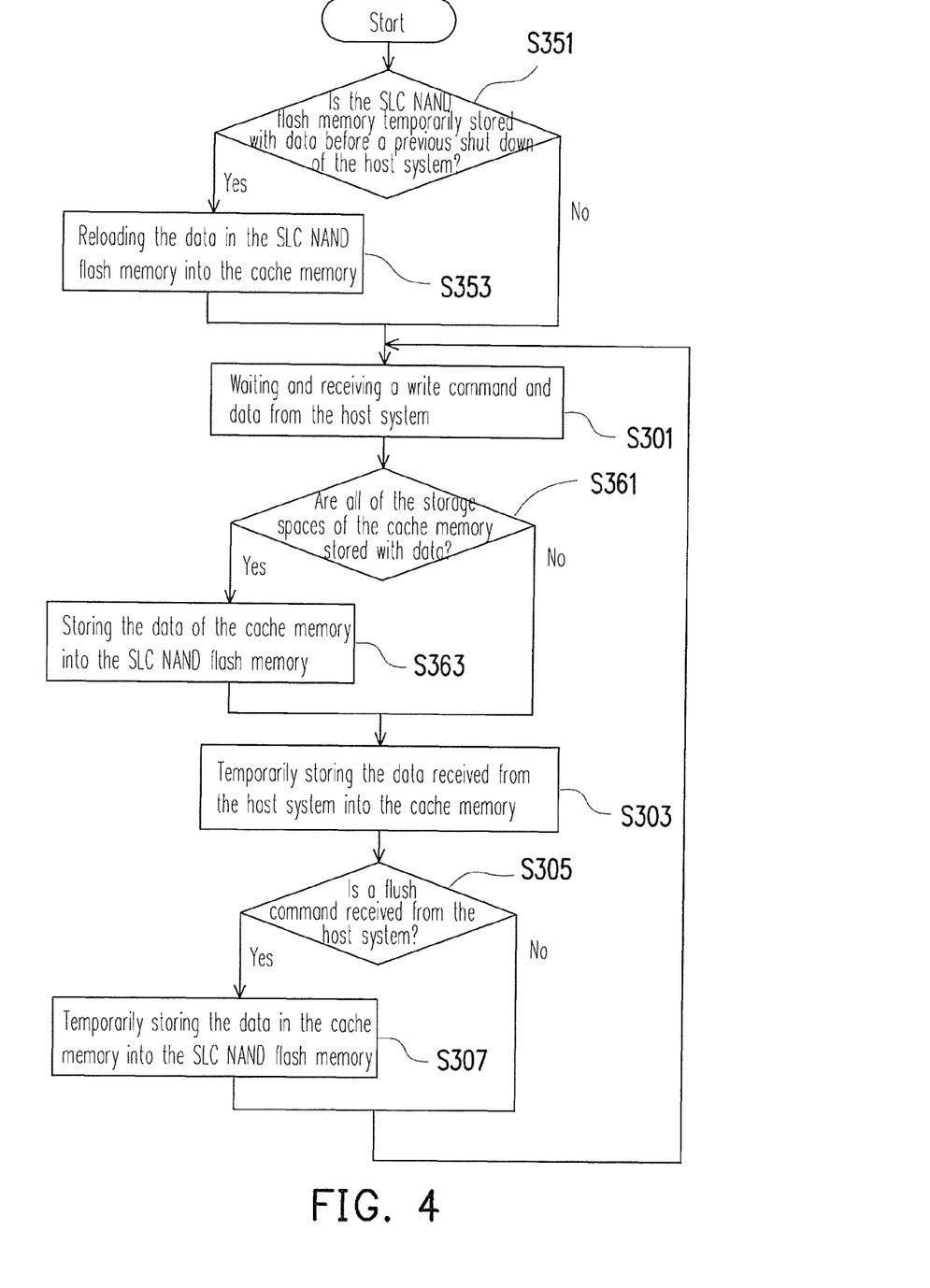
FIG. 4 is a flowchart illustrating data writing steps according to another exemplary embodiment of the present invention.

In another exemplary embodiment of the present invention, after the step S301, the data writing steps further include judging whether all of the storage spaces of the cache memory 140 are stored with data (step S361), and if all of the storage spaces of the cache memory 140 are stored with data, the controller 110 quickly stores the data of the cache memory 140 into the SLC NAND flash memory 150 (step S363) for releasing the storage space of the cache memory 140 to execute the write command received from the host system 200. Next, during a non-busy period (for example, the host system does not send the write command to the flash memory system 100 for a period of time (for example, 30 seconds), or a utilization efficiency of the controller is less than a specific threshold value) of the flash memory storage system 100, the data temporarily stored in the SLC NAND flash memory 150 is written into or is arranged to the MLC NAND flash memory 130.

It should be noted that if the host system 200 is immediately turned off after sending the flush command, the flash memory storage system 100 can confirm whether the SLC NAND flash memory 150 is stored with data when the host system 200 is rebooted. Therefore, before the step S301, in step S351, whether the SLC NAND flash memory 150 is temporarily stored with data before a previous shut down of the host system 200 is further judged.

If in the step 351, the SLC NAND flash memory 150 is judged to be stored with the temporarily stored data of a previous operation, in step S353, the data in the SLC NAND flash memory 150 is reloaded into the cache memory 140 for restoring an operation state of the flash memory storage system 100 before being turned off.

Moreover, in another exemplary embodiment of the present invention, when the SLC NAND flash memory 150 is judged to be stored with the temporarily stored data of the previous operation, the data temporarily stored within the SLC NAND flash memory 150 can be directly written into the MLC NAND flash memory 130 for accomplishing an unexecuted writing operation that should be executed by the flash memory storage system 100 before the host system 200 is turned off.

By applying the SLC NAND flash memory 150 which has a faster accessing speed than that of the MLC NAND flash memory 130 to serve as a temporary storage area for the cache memory 140, the time required for storing the data of the cache memory 140 when the flash memory system 100 receives the flush command can be effectively reduced.

Second Exemplary Embodiment

Figure 5:
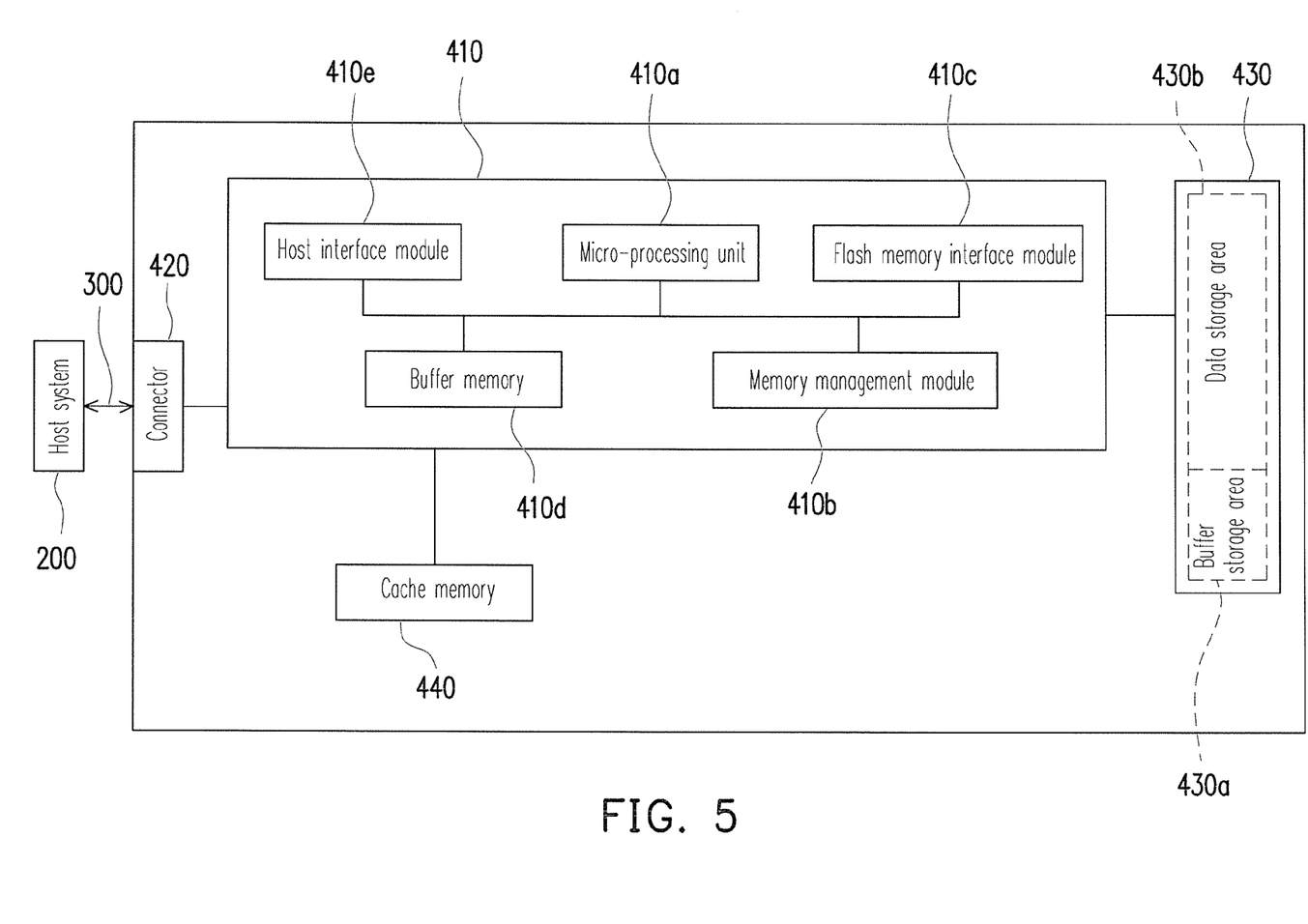
FIG. 5 is a schematic block diagram illustrating a flash memory storage system according to a second exemplary embodiment of the present invention.

FIG. 5 is a schematic block diagram illustrating a flash memory storage system according to a second exemplary embodiment of the present invention. Referring to FIG. 5, the flash memory storage system 400 includes a controller 410, a connector 420, a MLC NAND flash memory 430 and a cache memory 440, and the flash memory storage system 400 is a SSD.

Hardware structures of the controller 410, the connector 420 and the cache memory 440 are the same to that of the controller 110, the connector 120 and the cache memory 140 of the first exemplary embodiment, and detailed description thereof is not repeated.

It should be noted that the flash memory storage system 400 has a different hardware configuration compared to that of the flash memory storage system 100, so that the memory management module 410b of the controller 410 has the machine commands for executing the data writing steps (shown as FIG. 6) of the present exemplary embodiment. Besides, a micro-processing unit 410a, a flash memory interface module 410c, a buffer memory 410d and a host interface module 410e of the controller 410 are respectively the same to the micro-processing unit 110a, the flash memory interface module 110c, the buffer memory 110d and the host interface module 110e of the controller 110, and detailed descriptions thereof are not repeated.

The MLC NAND flash memory 430 is electrically connected to the controller 410 and is used for storing data. Similar to the MLC NAND flash memory 130 of the first exemplary embodiment, the MLC NAND flash memory 430 also includes a plurality physical blocks for storing data corresponding to the logical blocks in an alternation approach. Moreover, pages of the physical block of the MLC NAND flash memory 430 are divided into upper pages and lower pages.

In the present exemplary embodiment, the MLC NAND flash memory 430 is divided into a buffer storage area 430a and a data storage area 430b, wherein in the data storage area 430b, the controller 110 simultaneously utilizes the upper pages and the lower pages to store data, and in the buffer storage area 430a, the controller 110 only utilize the lower pages to store data. As described above, programming of the lower pages of the physical block of the MLC NAND flash memory is similar to that of the SLC NAND flash memory, so that the writing speed and stability of the buffer storage area 430a which only utilizes the lower pages are higher than that of the data storage area 430b which simultaneously utilizes the upper pages and the lower pages.

Particularly, in the present exemplary embodiment, the data storage area 430b is an area used for normally storing the user's data, and the buffer storing area 430a is used for temporarily storing the data of the cache memory 440. Namely, the buffer storage area 430a can provide a function similar to that of the SLC NAND flash memory 150 of the first exemplary embodiment. Similar to that described in the first exemplary embodiment, the storage capacity of the buffer storage area 430a is twice the bigger than that of the cache memory 440.

To be specific, when the host system 200 sends the flush command to the flash memory storage system 400, the controller 410 writes the data stored in the cache memory 440 into the buffer storage area 430a. As described above, since the writing speed of the buffer storage area 430a is higher than that of the data storage area 430b, the data stored in the cache memory 440 can be quickly stored into the buffer storage area 430, so as to avoid the operation delay of the host system 200 after sending the flush command.

Moreover, if the host system 200 is turned off and is rebooted, the data temporarily stored in the buffer storage area 430a is reloaded into the flash memory 140 for continually operating the flash memory storage system 400. Alternatively, in another exemplary embodiment of the present invention, when the host system 200 is rebooted, the data temporarily stored in the buffer storage area 430a is written or arranged to the data storage area 430b for accomplishing an unexecuted writing operation that should be executed by the flash memory storage system 100 before the host system 200 is turned off.

Figure 6:
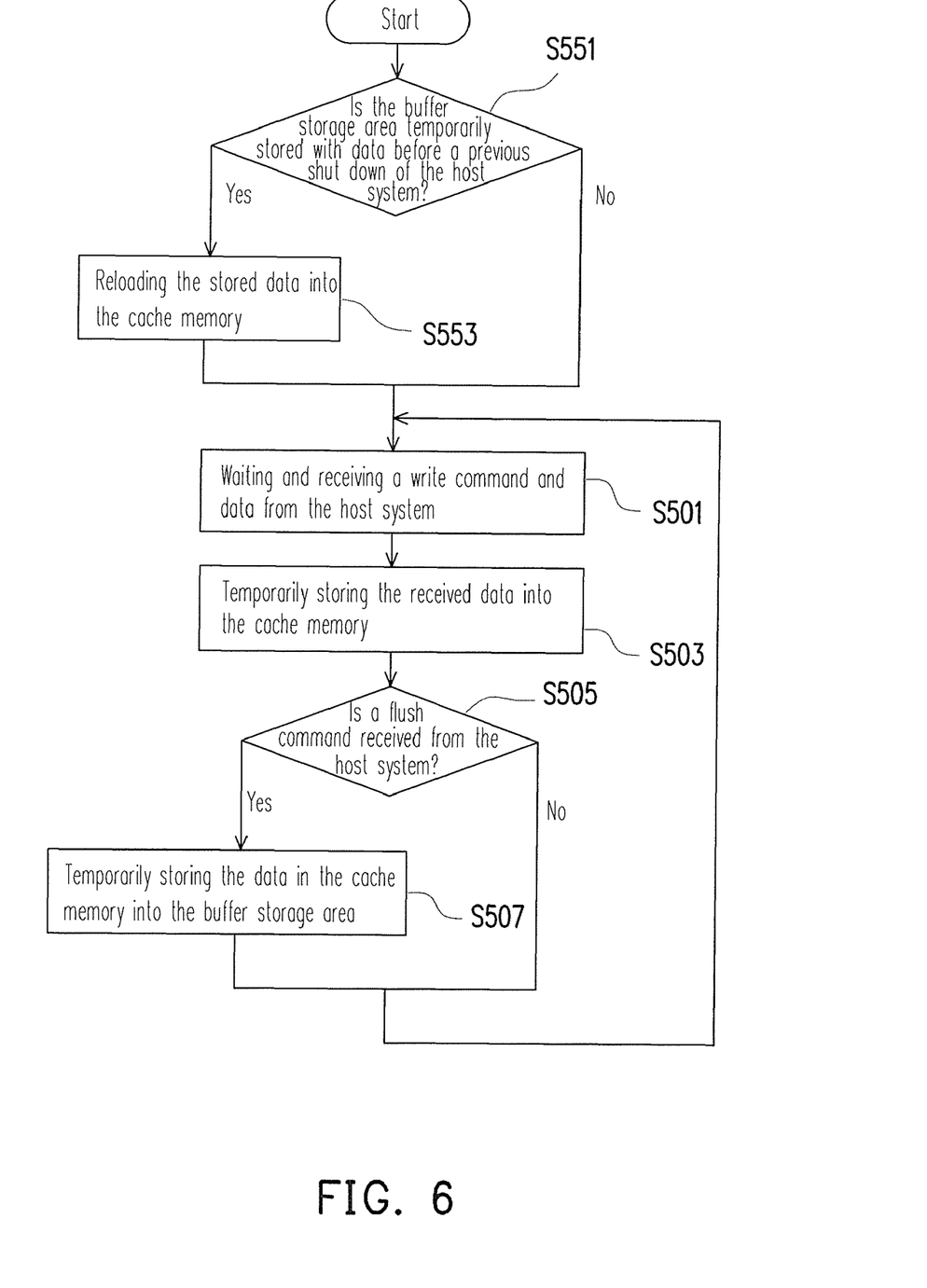
FIG. 6 is a flowchart illustrating data writing steps according to a second exemplary embodiment of the present invention.

FIG. 6 is a flowchart illustrating data writing steps according to the second exemplary embodiment of the present invention. Wherein, such steps are implemented by executing the machine commands of the memory management module 410b via the micro-processing unit 410a of the controller 410.

Referring to FIG. 6, in step S501, the flash memory storage system 200 is on standby and receives the write command and data from the host system 200. Next, in step S503, the received data is temporarily stored into the cache memory 440. Meanwhile, the controller 410 utilizes a non-busy period of the flash memory storage system 100 to write the data temporarily stored in the cache memory 440 into the data storage area 430b.

Next, in step S505, whether the flush command is received from the host system 200 is judged. If in the step S505, the flush command is judged to be received, in step S507, the data in the cache memory 440 is temporarily stored into the data storage area 430a.

In another exemplary embodiment of the present invention, if all of the storage spaces of the cache memory 440 are stored with data, and when the flash memory storage system 400 receives the write command from the host system 200, the controller 410 can also quickly stores the data of the cache memory 440 into the buffer storage area 430a. Next, during the non-busy period of the flash memory storage system 400, the controller 410 can move the data temporarily stored in buffer storage area 430a to the data storage area 430b.

Similarly, before the step S501, in step S551, whether the buffer storage area 430a is with data that is temporarily stored in the flash memory system 400 before a previous shut down of the host system 200 is further judged.

If in the step 551, the buffer storage area 430a is judged to be stored with the data temporarily stored before a previous shunt down of the host system 200, in step S553, the data is reloaded into the cache memory 440 for restoring an operation state of the flash memory storage system 100 before being turned off.

By applying the buffer storage area 430a which has a faster accessing speed than that of the data storage area 430b to serve as a temporary storage area for the cache memory 440, the time required for arranging the data of the cache memory 440 when the flash memory system 400 receives the flush command can be effectively reduced.

In summary, in the present invention, a memory having a relatively fast writing speed is applied to the MLC NAND flash memory storage system to serve as the temporary storage area for the data in the cache memory, the time required for arranging the data in the cache memory is shortened, so that a system delay is avoided. Particularly, since the SSD is widely applied to the computer systems to serve as the main hard disk, the operation efficiency of the computer system can be effectively improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A flash memory storage system, comprising:
a controller;
a connector, electrically connected to the controller;
a cache memory, electrically connected to the controller;
a single level cell (SLC) NAND flash memory, electrically connected to the controller; and
a multi level cell (MLC) NAND flash memory, electrically connected to the controller,
wherein when the controller receives data to be written into the MLC NAND flash memory from a host via the connector, the controller temporarily stores the data into the cache memory, and then writes the data into the MLC NAND flash memory from the cache memory, and
wherein when the controller receives a flush command from the host, the controller temporarily stores data stored in the cache memory into the SLC NAND flash memory,
wherein when rebooting, the controller determines whether the SLC NAND flash memory stores the data, and if the SLC NAND flash memory stores the data, the controller reloads the data temporarily stored in the SLC NAND flash memory to the cache memory.

2. The flash memory storage system as claimed in claim 1, wherein the controller temporarily stores the data stored in the cache memory to the SLC NAND flash memory when the cache memory is fully written with data.

3. The flash memory storage system as claimed in claim 1, wherein a capacity of the SLC NAND flash memory is twice as big as a capacity of the cache memory.

4. The flash memory storage system as claimed in claim 1, wherein the cache memory is a dynamic random access memory (DRAM) or a double data rate (DDR) DRAM.

5. A data writing method, for a flash memory storage system comprising a cache memory, a SLC NAND flash memory and a MLC NAND flash memory, the data writing method comprising:
temporarily storing data to be written to the flash memory storage system into the cache memory and writing the data into the MLC NAND flash memory from the cache memory;
when a flush command is received from a host, temporarily storing data stored in the cache memory into the SLC NAND flash memory; and
when rebooting, determining whether the SLC NAND flash memory stores data, and if the SLC NAND flash memory stores the data, reloading the data temporarily stored in the SLC NAND flash memory into the cache memory.

6. The data writing method as claimed in claim 5, wherein the step of temporarily storing data stored in the cache memory into the SLC NAND flash memory comprises temporarily storing data stored in the cache memory into the SLC NAND flash memory when the cache memory is fully stored with data.

7. A flash memory storage system, comprising:
a controller;
a connector, electrically connected to the controller;
a cache memory, electrically connected to the controller; and
a MLC NAND flash memory, electrically connected to the controller, and divided into a buffer storage area and a data storage area,
wherein the buffer storage area and the data storage area respectively have a plurality of physical blocks, each of the physical blocks comprises a plurality of lower pages and a plurality of upper pages, and the writing speed of the lower pages is faster than the writing speed of the upper pages, wherein when the controller receives data to be written into the MLC NAND flash memory from a host via the connector, the controller temporarily stores the data in the cache memory, wherein after the data is stored into the cache memory, the controller temporarily stores the data stored in the cache memory into the lower pages of the buffer storage area, wherein after the data is stored into the lower pages of the buffer storage area, the controller writes the data temporarily stored in the lower pages of the buffer storage area into the lower pages and the upper pages of the data storage.

8. The flash memory storage system as claimed in claim 7, wherein the controller temporarily stores the data stored in the cache memory to the lower pages of the buffer storage area when the cache memory is fully written with data.

9. The flash memory storage system as claimed in claim 7, wherein a capacity of the lower pages of the buffer storage area is twice as big as a capacity of the cache memory.

10. The flash memory storage system as claimed in claim 7, wherein the cache memory is a DRAM or a DDR DRAM.

11. A data writing method, for a flash memory storage system comprising a cache memory and a MLC NAND flash memory, wherein the MLC NAND flash memory comprises a buffer storage area and a data storage area, the buffer storage area and the data storage area respectively have a plurality of physical blocks, and each of the physical blocks comprises a plurality of lower pages and a plurality of upper pages, the data writing method comprising:

temporarily storing data to be written to the flash memory storage system into the cache memory and writing the data into the data storage area of the MLC NAND flash memory from the cache memory;

when a flush command is received from a host, temporarily storing data stored in the cache memory into the lower pages of the buffer storage area, and when rebooting, determining whether the lower pages of the buffer storage area store data, and if the lower pages of the buffer storage area store the data, reloading the data temporarily stored in the lower pages of the buffer storage area into the cache memory.

12. The data writing method as claimed in claim 11, wherein the step of temporarily storing data stored in the cache memory into the lower pages of the buffer storage area comprises temporarily storing data stored in the cache memory into the lower pages of the buffer storage area when the cache memory is fully written with data.

13. A flash memory storage system, comprising:
a controller;
a connector, electrically connected to the controller;
a cache memory, electrically connected to the controller;
a first non-volatile memory, electrically connected to the controller; and
a second non-volatile memory, electrically connected to the controller, wherein when the controller receives data to be written into the second non-volatile memory from a host via the connector, the controller temporarily stores the data in the cache memory, and then writes the data into the second non-volatile memory from the cache memory, and wherein when a flush command is received from the host, the controller temporarily stores the data stored in the cache memory into the first non-volatile memory, wherein when rebooting, the controller determines whether the first non-volatile memory stores data, and if the first non-volatile memory stores the data, the controller reloads the data temporarily stored in the first non-volatile memory to the cache memory.

* * * * *